United States Patent Office 3,361,503
Patented Jan. 2, 1968

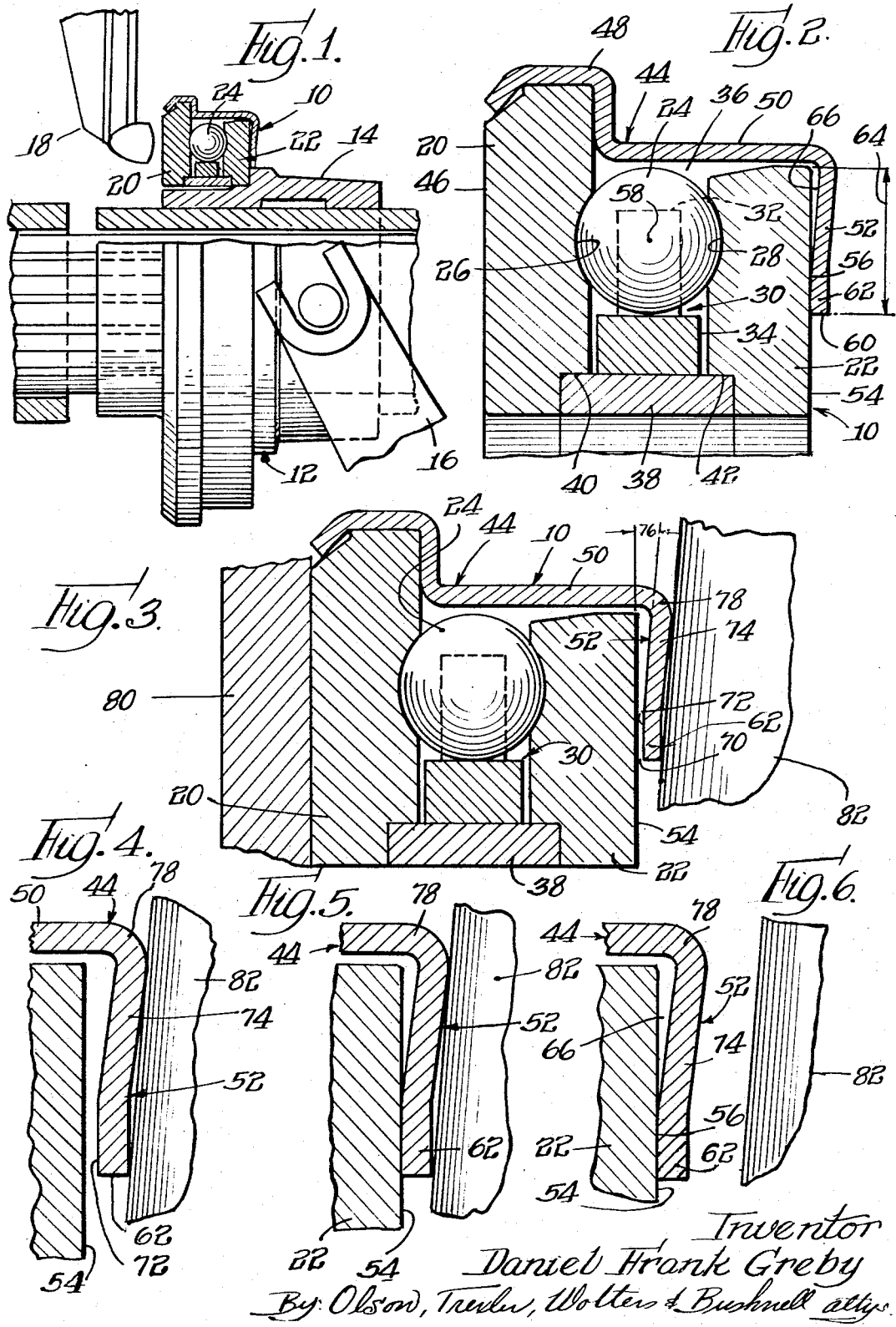

3,361,503
SEALED QUIET BALL THRUST BEARING
Daniel Frank Greby, Maywood, Ill., assignor to Textron, Inc., Providence, R.I., a corporation of Rhode Island
Filed Oct. 21, 1965, Ser. No. 499,345
5 Claims. (Cl. 308—233)

ABSTRACT OF THE DISCLOSURE

A sealed ball thrust bearing having two thrust rings sealably interconnected inwardly of the bearing balls and being restrained against movement away from each other, braked against relative rotation when coasting, and sealably interconnected by an outer shell member closely embracing both thrust rings axially and having a marginal side edge disposed in slidable thrust bearing engagement with one side of one thrust ring over an annular band of mutual engagement that is confined radially in width and located radially inward in relation to medial portions of the bearing balls so that the thrust rings are braked silently to a stop in relation to each other when the bearing is allowed to coast, free of applied external thrust.

---

This invention relates to sealed antifriction thrust bearings used in large numbers in automobiles as clutch release bearings.

The invention stems from perception that conventional clutch release bearings, which are marked by many very worthwhile inherent advantages are, nevertheless, sources of sound that can disturb the quiet desired in automobiles.

One object of the invention is to provide, for use as a clutch release bearing or the like, a sealed antifriction thrust bearing having an improved construction which affords the inherent advantages characteristic of conventional bearings of similar but unimproved construction, while at the same time making the improved bearing decidedly quieter in operation to the end that the generation of sound, previously attending the operation of conventional bearings, is effectively eliminated from the operation of the improved bearing.

Another object is to provide for use as a clutch release bearing or the like, an antifriction thrust bearing having a construction generally similar to that of conventional bearings used in large numbers, but improved to effectively avoid generation of sound as an incident to coasting of thrust transmitting parts to a stop in relation to each other at the end of individual periods of intermittent dynamic operation of the bearing under thrust load.

Another object is to provide an improved sealed thrust bearing, as recited in the preceding objects, which is well suited for economical manufacture.

Other objects and advantages will become apparent from the following description of the invention taken in conjunction with the drawings, in which:

FIGURE 1 is a partially sectioned fragmentary side view of a clutch release assembly incorporating a sealed thrust bearing constructed in accordance with the invention;

FIG. 2 is a radial sectional view on an enlarged scale of a completed sealed thrust bearing constructed in accordance with the invention;

FIG. 3 is a radial sectional view similar to FIG. 2 showing bearing parts placed together at the beginning of a final phase in the bearing assembly operation;

FIG. 4 is a fragmentary radial sectional view on a still larger scale illustrating the position of a sealing flange swaging roller in relation to the sealing flange and the adjacent thrust ring at the beginning of the final phase of the assembly operation illustrated in FIG. 3;

FIG. 5 is a fragmentary radial sectional view similar to FIG. 4 but illustrating the sealing flange swaging roller fully advanced in relation to the adjacent thrust ring; and FIG. 6 is a fragmentary radial sectional view similar to FIG. 5, but showing the swaging roller retracted from the sealing flange at the completion of the assembly operation.

Referring to the drawings in greater detail, the sealed thrust bearing 10 constructed in accordance with the invention as illustrated in the drawings in particularly advantageous, by virtue of its capability to operate intermittently with no significant generation of sound, for use in an automobile clutch release assembly, such as the assembly 12 illustrated, wherein the bearing 10 is mounted on an axially movable slide 14 for transmitting thrust from a clutch release fork 16 to a plurality of rotating clutch release arms 18 (only one of which is shown in FIG. 1).

Structurally, the sealed bearing 10, which is designed to transmit thrust with a minimum of friction, comprises two axially spaced thrust rings 20, 22 spaced apart by an annular series of rotary load bearing elements or balls 24 having rolling engagement with two opposed races 26, 28 formed in the respective thrust rings 20, 22. The balls 24 are spaced apart by an annular spacer 30 having a plurality of projections 32 extending outwardly between the balls 24 from a rotary base ring 34 positioned between the thrust rings 20, 22 inwardly of the balls 24.

Relative rotation of the thrust rings 20, 22 under a thrust load causes the balls 24 and spacer 30 to rotate within an internal grease space 36 located generally between the thrust rings 20, 22. The grease space 36 is sealed inwardly of the rotary ball spacer 30 by an inner shell ring or liner 38 of hollow cylindrical form extending between the thrust rings 20, 22. In this instance, one end of the inner liner 38 has a static annular connection 40 with the inner periphery of the thrust ring 20 which prevents lubricating grease (not shown) from escaping from the grease spacer 36 outwardly between the thrust ring 20 and inner liner 38. The opposite end of the liner 38 has a close running fit 42 with the inner periphery of the thrust ring 22 which permits relative rotation of the liner 38 and thrust ring 22, while forming between the liner 38 and thrust ring 22 a capillary seal, sometimes referred to in this art as a "labyrinth" seal which is effective for preventing lubricating grease from escaping outwardly between the liner 38 and thrust ring 22 from the grease space 36.

The two thrust rings 20, 22 are maintained in rolling engagement with the balls 24 and the grease space 36 is sealed outwardly of the balls 24 by an outer annular shell member 44, FIG. 2, spanning the thrust rings 20, 22 outwardly of the balls 24. More particularly, the outer shell member 44 functions, as will presently appear, to form a rotary seal between the two thrust rings 20, 22 and to transmit between the two thrust rings thrust for restraining movement of the two thrust rings away from each other when the bearing is released from an external thrust load.

The thrust ring 20 is substantially larger in diameter than the thrust ring 22 and has a flat outer annular face 46 which confronts the free ends of the clutch release arms 18. The outer periphery of the thrust ring 20 is encircled and tightly embraced by the adjacent end of the outer shell member 44 to form a static annular connection 48 between the thrust ring 20 and shell member 44 that is fluid tight.

A cylindrical portion 50 of the outer shell member 44, substantially smaller in diameter than the outer periphery of the thrust ring 20 extends axially from the thrust ring 20 in encircling relation to the balls 24 and the thrust ring 22, as shown in FIG. 2.

At the end of the cylindrical portion 50 remote from the thrust ring 20, the outer shell member 44 is turned radially inward to form a sealing and thrust flange 52 having a close running fit with a flat outer annular surface 54 on the thrust ring 22. The sealing and thrust flange 52 extends a rather extensive radial distance inwardly along the flat outer surface or face 54 of the thrust ring 22 to form a close fitting capillary seal 56, sometimes referred to in this art as a "labyrinth" seal, between the sealing flange 52 and thrust ring surface 54 which permits relative rotation of the outer shell member 44 and the thrust ring 22, while at the same time preventing the escape of lubricating grease from the grease space 36 between the outer shell member 44 and thrust ring 22. To make the capillary seal 56 fully effective in preventing the escape of lubricating grease from the grease space 36, the sealing flange 52 should extend radially inward a substantial radial distance inwardly of the radial position of the centers 58, FIG. 2, of the individual bearing balls 24.

The construction of the sealed bearing 10 as described thus far is typical of that of antifriction thrust bearings which have been used extensively as clutch release bearings in automobiles. Referring to the typical mounting of the bearing 10 in the clutch release assembly of FIG. 1, it will be noted that the thrust ring 22 is supported on the non-rotating slide 14, so that the larger thrust ring 20 confronts the rotating clutch release arms 18. Normally, all parts of the bearing 10 are stationary with respect to the thrust ring 22 supported on the slide 14.

Upon operation of the assembly 12 to transmit thrust to the arms 18, the thrust ring 20 engages and rotates with the arms 18, causing the thrust ring 20 and the liner 38 and outer shell member 44 and also the balls 24 and ball spacer 30 to rotate with respect to the thrust ring 22. Upon subsequent operation of the assembly 12 to disengage the thrust ring 20 from the rotating arm 18, all of the bearing parts previously rotating in relation to the thrust ring 22 begin coasting to a stop in relation to the thrust ring 22.

Thus, in clutch release service in an automobile, a thrust bearing is caused to operate intermittently with intermittent rotation of the bearing parts in relation to each other, followed by coasting of the parts to a stop in relation to each other. It has been perceived that conventional thrust bearings used in this service have been a source of undesirable noise generated as an incident to the intermittent coasting of previously rotating bearing parts to a stop in relation to other parts at the end of successive periods of dynamic operation of the bearing.

Having reference to the bearing 10, the bearing parts which coast to a stop upon disengagement of the bearing from the rotating arms 18 include, in addition to the balls 24 and ball spacer 30, the thrust ring 20 and the liner 38 and outer shell member 44 statically connected with the thrust ring 20. In conventional bearings generally similar to the bearing 10, as described thus far, the coasting of the rotating parts in relation to the non-rotating thrust ring 22 has produced significant sound regarded as noise.

The bearing 10 improved in the manner to be described will operate quietly under the same conditions with an effective elimination of sound during coasting to a stop of the rotating bearing parts in relation to the non-rotating thrust ring 22.

In the improved bearing 10, sliding engagement between the outer shell member 44 and the thrust ring 22 which rotate in relation to each other is confined to a flat annular band 62 of the sealing and thrust flange 52, which band 62 is narrow in relation to the radial width of the portion of the thrust ring 22 that is radially overlapped by the sealing flange 52, and which band 62 is formed by the radially inward marginal edge (also denoted by the number 62) of the sealing flange 52.

Thus, the annular band 62 is radially positioned immediately adjacent the radially inward extremity 60 of the sealing flange 52, FIG. 2.

Having reference to FIG. 2, the radial dimension of the extent to which the sealing flange 52 radially overlaps the thrust ring 22 is identified by the number 64.

For best results, the annular band 62 to which slidable engagement between the thrust ring 22 and the outer shell member 44 is confined should have a radial width ranging between ten percent and forty percent of the radial dimension 64 of the radial overlap of the sealing flange 52 and the thrust ring 22.

In the preferred construction which is illustrated in the drawings, the radial position and width of the sealing and thrust flange 52 is such that the radially inner extremity of the flange 52 and the radial inner extremity 60 of the flat band portion 62 of the flange 52 are radially aligned with the inner periphery of the orbital path of the thrust bearing balls 24, and the flat band portion 62 to which contact or slidable engagement between the flange 52 and thrust ring 22 is confined has a radial width virtually equal to twenty-five percent of the diameter of the individual bearing balls 24.

In the commercial form of the bearing 10, the width of the band 62 ranges substantially from twenty percent to thirty-three percent of the width 64 of the radial overlap of the sealing and thrust flange 52 and thrust ring 22.

To confine contact or slidable engagement between the sealing and thrust flange 52 and the thrust ring 22 to the narrow inner band 62 of the sealing flange 52, the improved bearing 10 is constructed to provide between the sealing and thrust flange 52 and the adjacent end face 54 of the thrust ring 22 a narrow but material axial space 66, FIGS. 2 and 6, extending radially outward from the interface 56 of the thrust ring surface 54 and the confronting sealing flange band portion 62.

Provision of the radially extending axial space 66 between the sealing flange 52 and the thrust ring 22, confining of contact or slidable engagement between the thrust ring 22 and the sealing and thrust flange 52 to the narrow band portion 62 of the sealing flange 52, and dimensioning of the outer shell element 44 to provide the positional relationship of the flange band portion 62 to the thrust ring surface 54 necessary for creating the effective capillary seal desired between the thrust ring 22 and the sealing flange 52 are all achieved by constructing and assembling the improved bearing 10 as illustrated in FIGS. 3 through 6.

The outer shell member 44 of the improved bearing 10 is fashioned to shape and position the sealing flange 52 as illustrated in FIG. 3, which shows the bearing parts assembled together in preparation for a final assembly operation. Before this final assembly operation, illustrated in FIGS. 3 through 6, is carried through, the bearing parts are placed together and the outer shell member 44 secured to the thrust ring 20 as shown in FIG. 3. The sealing flange 52 radially overlaps the thrust ring 22 in a manner such that there is a small but material axial spacing 70 of the inner marginal edge 62 of the flange 52 from the thrust ring surface 54, as illustrated in FIG. 3.

Prior to the final assembly operation, the sealing and thrust flange 52 is shaped as illustrated in FIG. 3, so that the inner marginal edge 62 of the sealing and thrust flange, which is to become the previously described sealing band 62, is flat. Thus, as indicated in FIGS. 3 and 4, the flat inner marginal edge 62 of the sealing and thrust flange 52 defines a flat annular sealing and thrust bearing surface 72 confronting the thrust ring surface 54 and having the radial width desired in the previously described sealing band portion 62 of the sealing flange 52.

Also, as illustrated in FIG. 3 and in FIG. 4, the preshaping of the sealing flange 52 is such that the annular portion 74 of the sealing and thrust flange 52 radially overlapping the thrust ring 22 and extending radially outward from the flat marginal edge 62 of the flange 52 has a truncated conical shape such that the conical form of the flange portion 74 opens axially outward and has an apex angle of the order of 174 to 178 degrees. Thus formed, the conical flange portion 74 diverges away from the adjacent flat face 54 of the thrust ring 22 in a radially outward direction at an angle 76, FIG. 3, which is of the order of one to three degrees, the angle 76 being exaggerated in FIG. 3, for clearness in illustration.

It will be noted with reference to FIG. 3 that the conical portion 74 of the sealing flange 52 is integrally connected with the adjacent end of a cylindrical portion 50 of the outer shell member 44 by a sharply curving segment or bend 78 in the outer shell member 44, as viewed in radial section, FIG. 3.

After the parts are placed together as illustrated in FIG. 3, the sharp bend 78 in the outer shell member 44 is rolled toward the thrust ring 20 to bring the flat annular sealing surface 72 of the inner marginal edge 62 of the sealing flange 52 into the exact desired close proximity to the thrust ring surface 54 to provide the desired capillary seal 56 extending radially across and radially confined to the narrow marginal edge or band 62 of the sealing flange 52.

As illustrated in FIG. 3, the thrust ring 20 is supported axially by a suitable support part 80, while the sharp bend 78 is rolled axially toward the thrust ring 20. Rolling of the bend 78 is effected by a plurality of circumferentially spaced swaging rollers 82 (only one of which is illustrated in FIG. 2). Each roller 82 is oriented so that its surface engages the sealing flange 52 at the bend 78 and at the inner periphery of the flange 52, as illustrated in FIGS. 3 and 4. Each of the rollers 82 is moved circumferentially around the sealing flange 52 and simultaneously moved axially toward the supported thrust ring 20 to swage the bend 78 toward the thrust ring 20 until axial movement of the flange 52 toward the thrust ring 20 is terminated by engagement of the inner periphery of the flange 52 with the adjacent face 54 of the thrust ring 22, as shown in FIG. 5.

The previously flattened inner marginal edge 62 of the flange 52 intervenes between the thrust ring surface 54 and each roller 82, as illustrated in FIG. 5, and has sufficient strength in compression to resist further inward movement of the roller 82, thereby serving automatically to terminate swaging of the bend 78 so that, upon removal of the rollers 82, as indicated in FIG. 6, the flat inner marginal edge 62 of the sealing flange 52 is properly positioned in relation to the thrust ring surface 54 to provide the desired capillary seal 56 extending across the relatively narrow marginal edge or band 62 of the flange 52.

After the swaging operation just described is completed, the portion 74 of the flange 52 extending outwardly from the flat inner marginal edge 62 of the flange retains its truncated conical form and diverges in a radially outward direction from the adjacent face 54 of the thrust ring 22 to provide between the thrust ring 22 and the sealing flange 52 the previously mentioned axial space 66, FIG. 6, which confines contact or slidable engagement between the thrust ring 22 and the outer shell member 44, which rotate in relation to each other, to the relatively narrow band 62 of the sealing and thrust flange 52, as previously described.

The improved bearing 10 is well suited for economical manufacture. It is particularly advantageous for use as a clutch release bearing in that at the completion of successive periods of intermittent dynamic operation, rotating parts of the bearing will coast quietly to a stop in relation to non-rotating parts of the bearing, even though no external thrust load is applied to the bearing, while the rotating parts are coasting to a stop.

The release of externally applied thrust from the bearing 10 is accompanied by the tendency of the bearing balls 24, inherent in thrust bearings of this type, to move the thrust rings 20, 22 away from each other. This tendency is restrained by axial thrust applied to the flat end face surface 54 of the ring 22 by the flat annular sealing and thrust bearing surface 72 formed on the sealing and thrust flange 52 of the outer shell member and slidably engaging the flat thrust ring surface 54. While restraining movement of the thrust rings 20, 22 away from each other, the slidable engagement of the flat sealing and thrust bearing surface 72 with the thrust ring surface 54 also functions during rotary coasting of the thrust rings 20, 22 relative to each other to brake relative turning movement of the two thrust rings. Braking, during coasting of the bearing, of relative turning movement of the thrust rings by the outer shell structure which forms a seal between the thrust rings and which restrains movement of the thrust rings away from each other is a normal functional characteristic of ball thrust bearings of this particular type.

As previously indicated, coasting of the improved bearing 10, accompanied as it is by the braking action of the outer shell member 44 on the relative turning movement of the thrust rings 20, 22, is virtually silent.

It will be appreciated that the invention is not necessarily limited to use of the exact construction specifically illustrated and described, but includes the use of structural variants within the spirit and scope of the invention as defined by the claims.

The invention is claimed as follows:

1. A sealed thrust bearing comprising, in combination, first and second annular thrust rings disposed in concentric axially confronting relation to each other for relative rotation about a common axis, a plurality of bearing balls intervening between said rings in rolling engagement with both rings to transmit thrust loads therebetween, means spanning said thrust rings inwardly of said bearing balls and forming a rotatable sealed connection between said rings, an outer shell member spanning said thrust rings outwardly of said bearing balls and having a sealed static annular connection to said first thrust ring and being rotatable in relation to said second thrust ring, said second thrust ring defining on the side thereof remote from said bearing balls a flat annular face surface, said outer shell member encircling said second thrust ring and having an annular sealing and thrust flange extending radially inward in overlapping relation to said annular face surface on said second thrust ring, said annular sealing and thrust flange having a flat inner marginal edge parallel to said flat annular face surface and defining on one side thereof a flat annular sealing and thrust bearing surface extending radially inward of the centers of said balls and slidably engaging said flat annular face surface on said second thrust ring over a narrow annular band of said sealing and thrust flange having a radial width that is confined to a minor fraction of the radial dimension of the radial overlap of said sealing and thrust flange and said second thrust ring so that the slidable engagement of said sealing and thrust bearing surface with said face surface over said narrow annular band forms a rotary seal between said outer shell member and said second thrust ring and transmits thrust from said sealing and thrust flange to said second thrust ring to restrain movement of said first and second thrust rings away from each other, and said sealing and thrust flange having a truncated conical shape outwardly of said flat inner marginal edge thereof so that the sealing and thrust flange diverges from said flat annular face surface in a radially outward direction from said narrow annular band of slidable engagement of said flat annular face surface with said flat annular sealing and thrust bearing surface on said flat marginal edge of said sealing and thrust flange.

2. A sealed thrust bearing comprising, in combination, first and second annular thrust rings disposed in concentric axially confronting relation to each other for rotation in relation to each other about a common axis, a plurality of bearing balls intervening between said rings in rolling engagement with both rings to transmit thrust loads therebetween, means on said rings forming a rotatable sealed connection between the rings inwardly of said load bearing balls, an outer shell member spanning said thrust rings in encircling relation to said bearing balls and having a sealed static annular connection to said first thrust ring, said second thrust ring defining on the radial side thereof remote from said load bearing elements a radially extending annular face surface, said outer shell member encircling said second thrust ring and having an annular sealing and thrust flange extending radially inward in axially overlapping relation to said annular face surface on said second thrust ring, said annular sealing and thrust flange having an inner marginal edge extending radially toward the axis of said thrust rings in parallel relation to the adjacent annular portion of said face surface on said second thrust ring, said inner marginal edge of said sealing and thrust flange defining on the radial side thereof adjacent said second thrust ring an annular sealing and thrust bearing surface having a close fitting slidable relationship with said annular face surface over a narrow annular band of said sealing and thrust flange extending from the inner edge of said sealing and thrust flange in a radially outward direction, said annular band extending radially inward of the centers of said balls and having a radial width that is confined to a minor fraction of the radial dimension of the radial overlap of said sealing and thrust flange and said second thrust ring, said close fitting slidable relationship of said sealing and thrust bearing surface on the inner marginal edge of said sealing and thrust flange with said annular face surface over said narrow annular band forming a seal between said outer shell member and said second thrust ring and constituting the only seal between said outer shell member and said second thrust ring, and said annular sealing and thrust flange and said annular face surface being shaped in relation to each other to provide therebetween an axial space of annular form extending radially outward from said band.

3. A sealed thrust bearing comprising, in combination, first and second annular thrust rings disposed in concentric axially confronting relation to each other for rotation in relation to each other about a common axis, said rings defining two annular races confronting each other, an annular series of bearing balls intervening between said rings in rolling engagement with both said races to transmit thrust loads between said rings, means on said rings forming a rotatable sealed connection between the rings inwardly of said load bearing elements, an outer shell member spanning said thrust rings in encircling relation to said bearing balls and having a sealed static annular connection to said first thrust ring, said second thrust ring defining on the side thereof remote from said load bearing elements a radially extending annular face surface, said outer shell member encircling said second thrust ring and having an annular sealing and thrust flange extending radially inward in axially overlapping relation to said annular face surface on said second thrust ring, said annular sealing and thrust flange having an inner marginal edge extending radially inward toward the axis of said thrust rings in parallel relation to the adjacent annular portion of said face surface on said second thrust ring, said inner marginal edge of said sealing and thrust flange defining on the radial side thereof adjacent said second thrust ring an annular sealing and thrust bearing surface having a close fitting slidable relationship with said annular face surface over a narrow annular band of said sealing and thrust flange, said annular band extending inwardly to the adjacent inner edge of said sealing and thrust flange and having a radial width that is at least ten percent and not greater than forty percent of the radial dimension of the radial overlap of said second thrust ring and said sealing and thrust flange extending radially outward from the inner periphery of said annular band, said close fitting slidable relationship of said sealing and thrust bearing surface on the inner marginal edge of said sealing and thrust flange with said annular face surface on said second thrust ring over said narrow annular band forming a seal between said outer shell member and said second thrust ring and constituting the only seal between said outer shell member and said second thrust ring, and said annular sealing flange and said annular face surface being shaped in relation to each other to provide therebetween an axial space of annular form extending radially outward from said band.

4. A sealed thrust bearing comprising, in combination, first and second annular thrust rings disposed in concentric axially confronting relation to each other for relative rotation about a common axis, said thrust rings defining two mutually confronting annular races, an annular series of bearing balls intervening between said rings in rolling engagement with both said races to transmit thrust loads between said rings and circulate relative to said rings in an annular path, means spanning said thrust rings inwardly of said bearing balls and forming a rotatable sealed connection between said rings, an outer shell member spanning said thrust rings outwardly of said bearing balls and having a sealed static annular connection to said first thrust ring and being rotatable in relation to said second thrust ring, said second thrust ring defining on the side thereof remote from said load bearing elements a flat annular face surface, said outer shell member encircling said second thrust ring and having an annular sealing and thrust flange extending radially inward in axially overlapping relation to said annular face surface on said second thrust ring, said sealing and thrust flange having a flat inner marginal edge parallel to said flat annular face surface on said second thrust ring and extending radially inward, the inner extremity of said inner marginal edge of said flange being substantially aligned radially with the inner periphery of said annular path of said balls, said inner marginal edge of said annular sealing and thrust flange defining on the radial side thereof adjacent said second thrust ring a flat annular sealing and thrust bearing surface extending inwardly substantially to said inner extremity of the sealing flange and having a close fitting slidable relationship with said flat annular face surface over a narrow annular band of said sealing flange having a radial width that is confined to a minor fraction of the radial dimension of the radial overlap of said sealing and thrust flange and said second thrust ring, said close fitting slidable relationship of said flat sealing and thrust bearing surface on the inner marginal edge of said sealing and thrust flange with said flat annular face surface over said narrow annular band forming a seal between said outer shell member and said second thrust ring and constituting the only seal between said outer shell member and said second thrust ring, and said sealing flange having a truncated conical shape outwardly of said narrow annular band so that the sealing and thrust flange diverges from said flat annular face surface in a radially outward direction from said narrow annular band in which a seal is formed between said outer shell member and said second thrust ring and in which said sealing and thrust flange slidably engages said flat annular face surface to restrain movement of said thrust rings away from each other.

5. A sealed thrust bearing comprising, in combination, first and second annular thrust rings disposed in concentric axially confronting relation to each other for relative rotation about a common axis, said thrust rings defining two mutually confronting annular races, an annular series of bearing balls intervening between said rings in rolling engagement with both said races to transmit thrust loads between said rings and circulate relative to said rings in an annular path, means spanning said thrust rings inwardly of said bearing balls and forming a rotatable sealed connection between said rings, an outer shell member spanning said thrust rings outwardly of said bearing balls and having a sealed static annular connection to said first thrust ring and being rotatable in relation to said second thrust ring, said second thrust ring defining on the side thereof remote from said load bearing elements at flat annular face surface, said outer shell member encircling said second thrust ring and having an annular sealing and thrust flange extending radially inward in axially overlapping relation to said annular face surface on said second thrust ring, said sealing flange extending radially inward to an inner extremity thereof substantially aligned radially with the inner periphery of said annular path of said balls, said annular sealing and thrust flange having a flat inner marginal edge parallel to said flat annular face surface and terminating inwardly at said inner extremity of the sealing and thrust flange, said flat marginal edge of said flange defining a flat annular sealing and thrust bearing surface having a close fitting slidable relationship with said flat annular face surface over a narrow annular band immediately adjacent said inner extremity of the sealing and thrust flange, said narrow annular band having a radial width that is at least ten percent and not greater than forty percent of the radial dimension of the radial overlap of said sealing and thrust flange and said second thrust ring, said close fitting slidable relationship of said flat sealing and thrust bearing surface on the inner marginal edge of said sealing and thrust flange with said flat annular face surface over said narrow annular band forming a seal between said outer shell member and said second thrust ring and constituting the only seal between said outer shell member and said second thrust ring, and said sealing flange having a truncated conical shape outwardly of said narrow annular band so that the sealing flange diverges from said flat annular face surface in a radially outward direction from said narrow annular band in which a seal is formed between said outer shell member and said second thrust ring and in which said sealing and thrust flange slidably engages said flat annular face surface to restrain movement of said thrust rings away from each other.

References Cited

UNITED STATES PATENTS

| | | | |
|---|---|---|---|
| 2,000,276 | 5/1935 | Delaval-Crow | 308—187.2 |
| 2,189,197 | 2/1940 | Cerny | 277—42 |
| 2,224,704 | 12/1940 | Stein | 308—187.2 |
| 2,403,460 | 7/1946 | Rozner | 308—233 |
| 2,404,610 | 7/1946 | Abell | 308—187.1 |
| 3,031,198 | 4/1962 | Hudson | 277—42 |
| 3,277,988 | 10/1966 | Pitner | 192—98 |

MARTIN P. SCHWADRON, *Primary Examiner.*

FRANK SUSKO, *Examiner.*